United States Patent [19]

Minefuji

[11] Patent Number: 4,913,540
[45] Date of Patent: Apr. 3, 1990

[54] TELECENTRIC PROJECTION LENS SYSTEM

[75] Inventor: Nobutaka Minefuji, Tokyo, Japan

[73] Assignee: Asahi Kogaku Kogyo Kabushiki Kaisha, Tokyo, Japan

[21] Appl. No.: 383,689

[22] Filed: Jul. 24, 1989

[30] Foreign Application Priority Data

Jul. 30, 1988 [JP]   Japan .................................. 63-191160

[51] Int. Cl.$^4$ ........................... G02B 9/60; G02B 9/62
[52] U.S. Cl. .................................... 350/415; 350/464; 350/465; 350/466
[58] Field of Search ................. 350/415, 464, 465, 466

[56] References Cited

U.S. PATENT DOCUMENTS 3,947,094  3/1976  Ikemori ........................... 350/415 X
4,441,792  4/1984  Tateoka ............................... 350/415

FOREIGN PATENT DOCUMENTS 56-123511  9/1981  Japan .
63-1561  1/1988  Japan .

*Primary Examiner*—Scott J. Sugarman
*Attorney, Agent, or Firm*—Sughrue, Mion, Zinn, Macpeak & Seas

[57] ABSTRACT

A wide-angle telecentric projection lens system for use in enlarged projection at a magnification of about 15-20, that has a brightness of about $F_{NO}$ 1:7, and which covers a wide field of up to about 25 degrees in terms of the half viewing angle. This is attained by a telecentric projection lens system that comprises, in order from the screen side to the chart side, a first lens group composed of a single positive lens element, a second lens group composed of either a single negative lens element or a positive lens cemented to a negative lens, and a third lens group composed of both a negative lens cemented to a positive lens and two or more positive lens elements, which lens system satisfies the following conditions (1) and (2):

(1) $-2.5 < f_I/f_{II} < -0.5$
(2) $0.6 < f_{III}/f < 0.95$
  where
f: the focal length of the overall lens system
$f_I$: the focal length of the first lens group
$f_{II}$: the focal length of the second lens group
$f_{III}$: the focal length of the third lens group

7 Claims, 8 Drawing Sheets

TELECENTRIC PROJECTION LENS SYSTEM

BACKGROUND OF THE INVENTION

The present invention relates to a wide-angle telecentric projection lens system for use in enlarged projection at a magnification of about 15–20, that has a brightness of about $F_{NO}1:7$, and which covers a wide field of up to about 25 degrees in terms of the half viewing angle.

One technique for producing a large television picture is to project a small television picture onto a screen at an enlarged size. In this type of television system, generally referred to as a projection television system, separate B, G and R images are projected onto the screen via three respective lenses, with the B, G and R information being synthesized on the screen. Such television systems, however, have drawbacks in that, first, the need for three separate lenses for projecting B, G and R images results in a high cost, and, secondly, it is difficult to achieve alignment among the respective B, G and R images.

With a view to solving these problems, a television system has been proposed in which a color separating prism synthesizes B, G and R image information, which is then projected onto the screen using a single projection lens. The use of a color separating prism necessitates a telecentric lens, a known example of which is described in Japanese Patent Publication No. 63-1561. The telecentric lens system described in this patent is bright since its F number is on the order of 1:5. However, its half viewing angle of only up to about 12 degrees is too narrow to fully satisfy the requirement for overall size reduction for purposes of projection television. Thus, the telecentric lens system described in Japanese Patent Publication No. 63-1561 has a definite room for improvement.

SUMMARY OF THE INVENTION

An object, therefore, of the present invention is to provide a telecentric projection lens system that covers a wide field (at least 25 degrees in terms of half viewing angle, $\omega$) and which yet is capable of effective compensation for aberrations.

This object of the present invention is attained by a telecentric projection lens system that comprises, in order from the screen side to the chart side, a first lens group composed of a single positive lens element, a second lens group composed of either a single negative lens element or a positive lens cemented to a negative lens, and a third lens group composed of both a negative lens cemented to a positive lens and two or more positive lens elements, which lens system satisfies the following conditions (1) and (2):

(1) $-2.5 < f_I/f_{II} < -0.5$
(2) $0.6 < f_{III}/f < 0.95$
where
 f: the focal length of the overall lens system
 $f_I$: the focal length of the first lens group
 $f_{II}$: the focal length of the second lens group
 $f_{III}$: the focal length of the third lens group In a preferred embodiment, the first lens group is composed of a single positive lens element having a convex surface directed toward the screen, and the following conditions (3) and (4) are additionally satisfied:

(3) $0.4 < r_I/f$
(4) $1.65 < n_I$
where
 $r_I$: the radius of curvature of the convex surface directed toward the screen
 $n_I$: the refractive index of the first lens group at the d-line In another preferred embodiment, the second lens group is composed of either a single negative lens element having a concave surface directed toward the chart (the picture image source), or a positive lens cemented to a negative lens in such a way that a concave surface is directed toward the chart, and the following condition (5) is additionally satisfied:

(5) $0.3 < r_{II}/f < 3.5$
where
 $r_{II}$: the radius of curvature of the concave surface directed toward the chart In still another preferred embodiment, the third lens group is composed of both a negative lens cemented to a positive lens in such a way that a strong concave surface is directed toward the screen, and two or three positive lens elements, and the following conditions (6) and (7) are additionally satisfied:

(6) $23 < \nu_+ - \nu_- < 42$
(7) $45 < \bar{\nu}_+$
where
 $\nu_+$: the Abbe number of the positive lens in the cemented lens
 $\nu_-$: the Abbe number of the negative lens in the cemented lens
 $\bar{\nu}_+$: the average Abbe number of the two or three positive lens elements The most important aspect of the present invention is that a wide-angle telecentric projection lens system capable of covering a wide field of up to about 25 degrees in terms of half viewing angle is constructed by adopting a simple lens composition including only about six to eight lens elements.

DESCRIPTION OF THE PREFERRED EMBODIMENTS

The conditions to be satisfied by the telecentric projection lens system of the present invention are described hereinafter.

Condition (1) above sets forth the requirement that should be met by the ratio of the focal length of the first lens group to that of the second lens group. By properly distributing the lens power between the first and second lens groups, balance is attained in the compensation for spherical aberration and coma, while at the same time the distance between the lens system and the chart is sufficiently increased to insure the space necessary for accommodating a color separating prism and other components. If the upper limit of condition (1) is exceeded, the power of the first lens group becomes too strong to allow sufficient compensation for spherical aberration. Moreover, the power of the second lens group becomes so weak that it is difficult to insure a large space on the chart side. If the lower limit of condition (1) is not reached, the power of the second lens group becomes strong, making it possible to insure a large space on the chart side. On the other hand, the radius of curvature of the second lens group becomes small and hence rapidly increased coma will occur in the marginal portion of image plane.

Condition (2) sets forth the requirement that should be satisfied by the ratio of the focal length of the third lens group to the focal length of the overall system. The third lens group serves to produce telecentric rays by ensuring that the intercept of the principal ray that has passed through the first and second lens groups is remote from the optical axis. By satisfying condition (2), the third lens group is capable of effective compensation for astigmatism and field curvature. If the upper limit of condition (2) is exceeded, the power of the third lens group is reduced, making it difficult to achieve compensation for astigmatism and field curvature in a balanced way. If the lower limit of condition (2) is not reached, the power of the third lens group becomes so strong as to cause increased astigmatism.

Condition (3) sets forth the requirement that should be satisfied by the shape of the first lens group in order to achieve balanced compensation for coma and distortion at wide angles. In order to ensure that a wide angle exceeding 25 degrees in terms of half viewing angle, distortion is reduced in both the central and marginal portions while the occurrence of coma is minimized to produce an image of high contrast, the surface of the first lens group on the screen side is preferably convex, and by insuring that the curvature of radius of this surface is within the range specified by condition (3), good lens performance can be attained. If the lower limit of this condition is not reached, the radius of curvature of the surface of the first lens group on the screen side is too small to effectively reduce spherical aberration and coma.

Condition (4) sets forth the requirement that should be satisfied by the refractive index of the first lens group in order to obtain a flat image plane in a wide image circle. If this condition is not met, it becomes undesirably difficult to reduce the amount of field curvature.

Condition (5) sets forth the requirement that should be satisfied by the shape of the second lens group. By insuring that the radius of curvature of the surface of the second lens group on the chart side is within the range specified by this condition, it becomes possible to keep the Petzval sum at a satisfactory value and to compensate for field curvature and astigmatism in a balanced way. If the upper limit of condition (5) is exceeded, the Petzval sum is so much undercompensated that it becomes difficult to sufficiently reduce the amount of field curvature. If the lower limit of condition (5) is not reached, not only is the Petzval sum overcompensated but also the radius of curvature of the surface of the second lens group on the chart side is too small to avoid the occurrence of strong negative distortion.

Condition (6) sets forth the requirement that should be satisfied by the differential Abbe number of the cemented lens in the third lens group, which is composed of a negative lens and a positive lens. The third lens group serves to ensure that the intercept of the principal ray of an extra-axial object point is sufficiently high to provide a telecentric optical system. In a telecentric optical system of the type contemplated by the present invention, it is particularly important to minimize the occurrence of lateral chromatic aberration. In the lens system of the present invention, the cemented lens, which is composed of a negative and a positive lens and which is disposed in the third lens group at a position where the height of the intercept of the principal ray of an off-axis point is comparatively low, is responsible for compensation for the chromatic aberration that develops in the third lens group. By cementing a negative and a positive lens that are made of optical materials that satisfy condition (6), it becomes possible to reduce the amount of lateral chromatic aberration.

Condition (7) sets forth the requirement that should be satisfied by the average Abbe number of the two or three positive lens elements in the third lens group. The plurality of positive lenses in the third lens group are responsible for keeping the intercept of the principal ray of an extra-axial point remote from the optical axis, and for this purpose it is important to ensure that the chromatic aberration that has been effectively compensated by the cemented lens is not increased. Thus, by making the positive lens elements of an optical material that satisfies condition (7), it becomes possible to achieve satisfactory compensation for chromatic aberration.

Seven examples of the present invention are described in the table below, in which $F_{NO}$ denotes the aperture ratio; f, the focal length of the overall system; M, the magnification on the chart side; x, the half viewing angle; r, the radius of curvature of an individual lens; d, the lens thickness or the aerial distance between lenses; n, the refractive index of an individual lens at the d-line; and m, the Abbe number of an individual lens.

EXAMPLE 1

Figure 1:
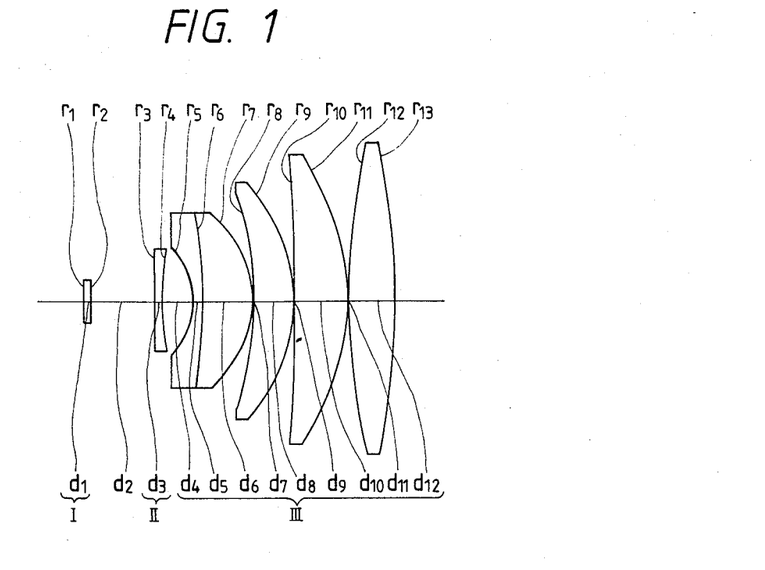
FIGS. 1, 3, 5, 7, 9, 11 and 13 are simplified cross-sectional views of the systems respectively constructed in accordance with Examples 1–7 herein of the present invention.
Figure 2:
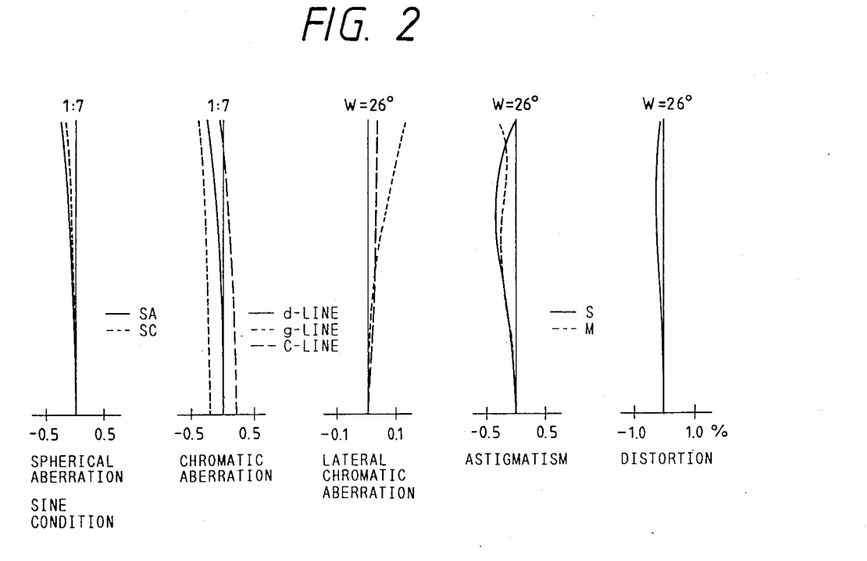
FIGS. 2, 4, 6, 8, 10, 12 and 14 are graphs showing aberration curves obtained at a magnification of 0.57X on the chart side of the lens systems of Examples 1–7, respectively.

$F_{NO} = 1:7$     $f = 100.00$
$M = -0.057X$     $\omega = 26°$

| Surface No. | r | d | n | ν |
|---|---|---|---|---|
| 1 | 224.972 | 2.50 | 1.80518 | 25.4 |
| 2 | −224.972 | 23.45 | | |
| 3 | −639.920 | 3.12 | 1.65844 | 50.9 |
| 4 | 103.737 | 10.62 | | |
| 5 | −26.550 | 3.75 | 1.80518 | 25.4 |
| 6 | −168.469 | 17.71 | 1.51633 | 64.1 |
| 7 | −38.433 | 0.62 | | |
| 8 | −121.110 | 13.56 | 1.51633 | 64.1 |
| 9 | −60.812 | 0.62 | | |
| 10 | −826.647 | 18.37 | 1.51633 | 64.1 |
| 11 | −88.124 | 0.62 | | |
| 12 | 256.218 | 15.69 | 1.51633 | 64.1 |
| 13 | −256.218 | | | |

(1) $f_I/f_{II} = -1.035$
(2) $f_{III}/f = 0.840$
(3) $r_I/f = 2.250$
(4) $n_I = 1.80518$
(5) $r_{II}/f = 1.037$
(6) $\nu_+ - \nu_- = 38.7$
(7) $\nu_+ = 64.1$

EXAMPLE 2

Figure 3:
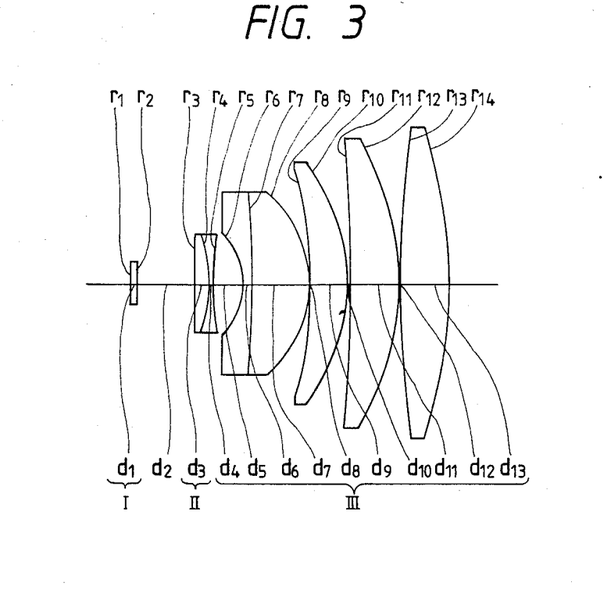
Figure 4:
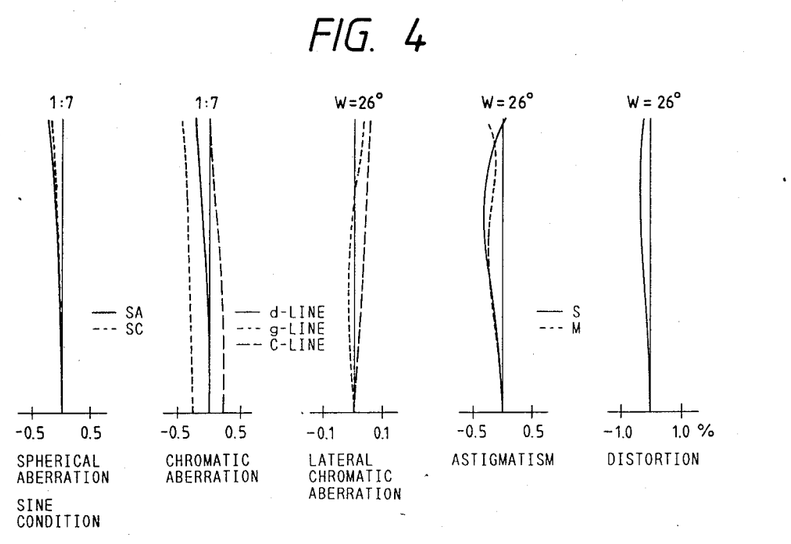

$F_{NO} = 1:7$     $f = 100.00$
$M = -0.057X$     $\omega = 26°$

| Surface No. | r | d | n | ν |
|---|---|---|---|---|
| 1 | 161.831 | 2.50 | 1.69895 | 30.1 |
| 2 | −230.303 | 21.02 | | |

EXAMPLE 2

$F_{NO} = 1:7$ $\quad f = 100.00$
$M = -0.057X$ $\quad \omega = 26°$

| Surface No. | r | d | n | ν |
|---|---|---|---|---|
| 3 | −709.149 | 5.07 | 1.80518 | 25.4 |
| 4 | −50.002 | 1.87 | 1.74950 | 35.3 |
| 5 | 106.436 | 10.45 | | |
| 6 | −26.971 | 3.75 | 1.80518 | 25.4 |
| 7 | −348.129 | 20.35 | 1.56873 | 63.1 |
| 8 | −41.819 | 0.62 | | |
| 9 | −141.815 | 13.19 | 1.56873 | 63.1 |
| 10 | −68.190 | 0.62 | | |
| 11 | −927.409 | 17.21 | 1.51633 | 64.1 |
| 12 | −98.818 | 0.62 | | |
| 13 | 414.839 | 16.98 | 1.51633 | 64.1 |
| 14 | −175.857 | | | |

(1) $f_I/f_{II} = -0.966$
(2) $f_{III}/f = 0.847$
(3) $r_I/f = 1.618$
(4) $n_I = 1.69895$
(5) $r_{II}/f = 1.064$
(6) $\nu_+ - \nu_- = 37.7$
(7) $\nu_+ = 63.8$

EXAMPLE 3

Figure 5:
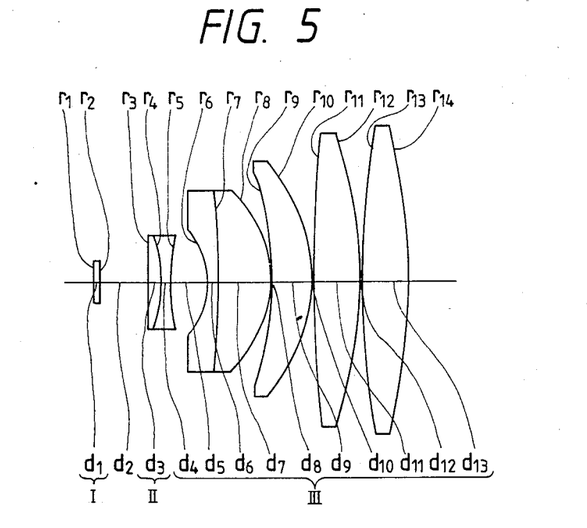
Figure 6:
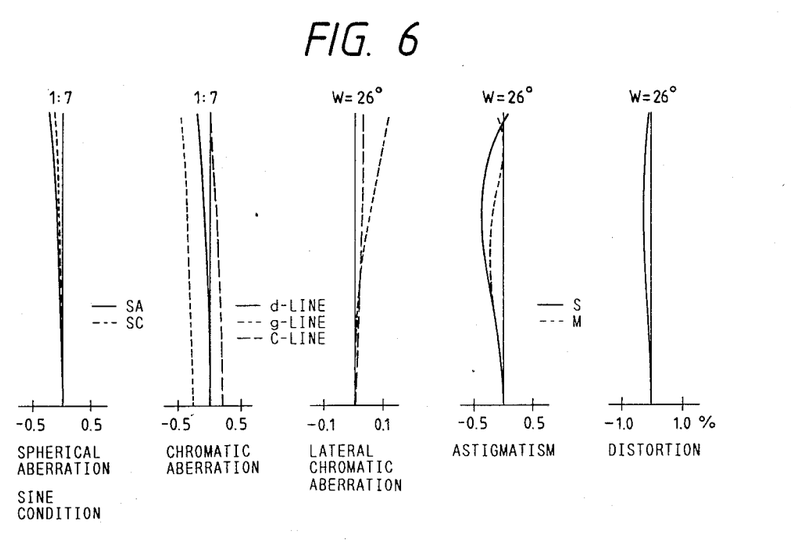

$F_{NO} = 1:7$ $\quad f = 100.00$
$M = -0.057X$ $\quad \omega = 26°$

| Surface No. | r | d | n | ν |
|---|---|---|---|---|
| 1 | 119.410 | 2.50 | 1.80440 | 39.6 |
| 2 | −417.068 | 17.70 | | |
| 3 | −874.857 | 5.00 | 1.72342 | 38.0 |
| 4 | −41.896 | 3.13 | 1.60738 | 56.8 |
| 5 | 74.633 | 13.48 | | |
| 6 | −27.145 | 3.75 | 1.80518 | 25.4 |
| 7 | −363.465 | 19.40 | 1.56873 | 63.1 |
| 8 | −40.843 | 0.62 | | |
| 9 | −113.052 | 14.47 | 1.51633 | 64.1 |
| 10 | −58.732 | 0.62 | | |
| 11 | 436.689 | 16.50 | 1.51633 | 64.1 |
| 12 | −153.350 | 0.63 | | |
| 13 | 314.905 | 16.50 | 1.51633 | 64.1 |
| 14 | −215.850 | | | |

(1) $f_I/f_{II} = -0.714$
(2) $f_{III}/f = 0.873$
(3) $r_I/f = 1.194$
(4) $n_I = 1.80440$
(5) $r_{II}/f = 0.746$
(6) $\nu_+ - \nu_- = 37.7$
(7) $\nu_+ = 64.1$

EXAMPLE 4

Figure 7:
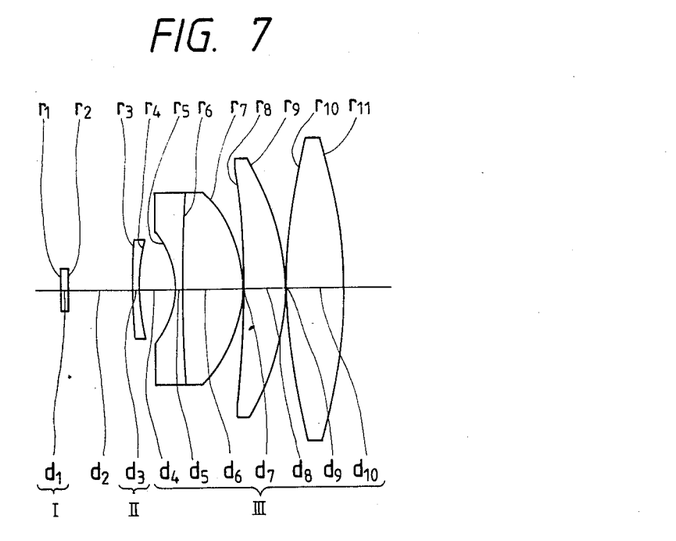
Figure 8:
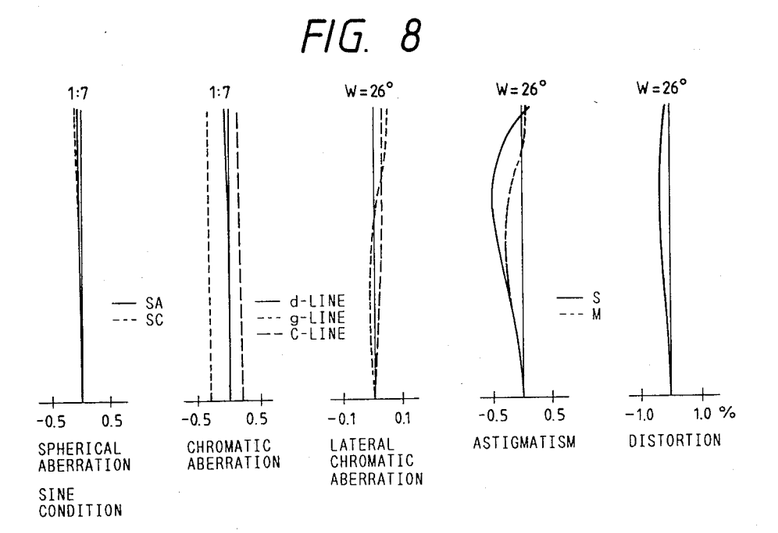

$F_{NO} = 1:7$ $\quad f = 100.00$
$M = -0.057X$ $\quad \omega = 26°$

| Surface No. | r | d | n | ν |
|---|---|---|---|---|
| 1 | 90.887 | 2.50 | 1.83400 | 37.2 |
| 2 | −9326.456 | 23.61 | | |
| 3 | 245.320 | 2.50 | 1.77250 | 49.6 |
| 4 | 68.936 | 12.78 | | |
| 5 | −29.692 | 3.12 | 1.80518 | 25.4 |
| 6 | 441.727 | 22.26 | 1.64850 | 53.0 |
| 7 | −44.874 | 0.62 | | |
| 8 | −315.904 | 15.15 | 1.65844 | 50.9 |
| 9 | −82.740 | 0.62 | | |
| 10 | 204.165 | 20.25 | 1.65844 | 50.9 |
| 11 | −185.436 | | | |

(1) $f_I/f_{II} = -0.846$
(2) $f_{III}/f = 0.831$
(3) $r_I/f = 0.909$
(4) $n_I = 1.83400$
(5) $r_{II}/f = 0.689$
(6) $\nu_+ - \nu_- = 27.6$
(7) $\nu_+ = 50.9$

EXAMPLE 5

Figure 9:
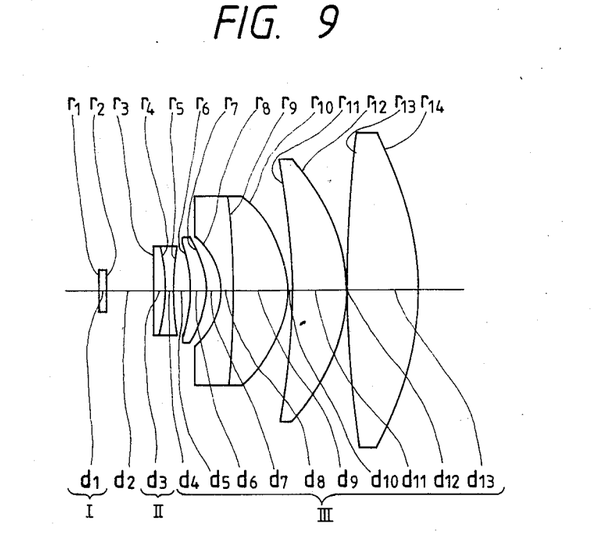
Figure 10:
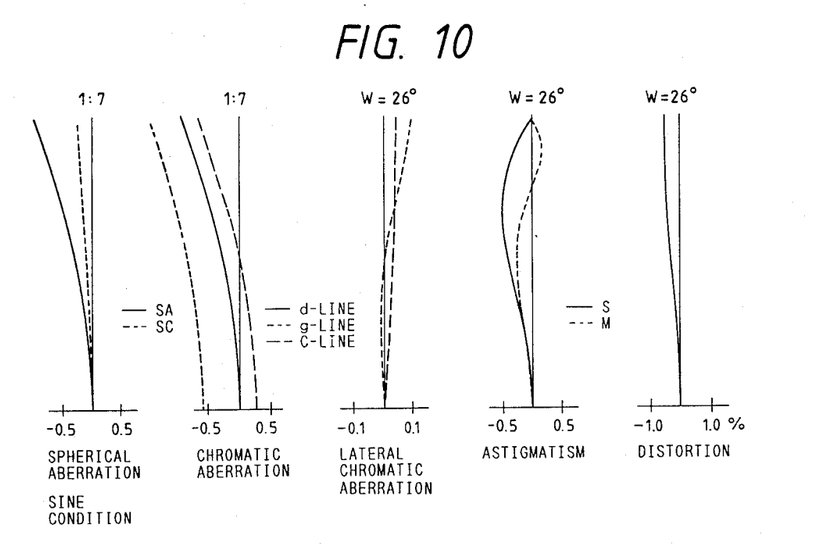

$F_{NO} = 1:7$ $\quad f = 100.00$
$M = -0.057X$ $\quad \omega = 26°$

| Surface No. | r | d | n | ν |
|---|---|---|---|---|
| 1 | 103.230 | 3.12 | 1.68893 | 31.1 |
| 2 | −199.625 | 16.60 | | |
| 3 | −174.585 | 4.03 | 1.48749 | 70.2 |
| 4 | −72.378 | 2.87 | 1.80400 | 46.6 |
| 5 | 87.280 | 6.00 | | |
| 6 | −49.000 | 5.62 | 1.76182 | 26.6 |
| 7 | −31.011 | 4.98 | | |
| 8 | −25.206 | 4.44 | 1.80518 | 25.4 |
| 9 | −272.225 | 19.75 | 1.56873 | 63.1 |
| 10 | −40.941 | 1.25 | | |
| 11 | −230.941 | 19.29 | 1.51633 | 64.1 |
| 12 | −64.030 | 0.62 | | |
| 13 | 411.480 | 24.99 | 1.51633 | 64.1 |
| 14 | −108.432 | | | |

(1) $f_I/f_{II} = -1.605$
(2) $f_{III}/f = 0.743$
(3) $r_I/f = 1.032$
(4) $n_I = 1.68893$
(5) $r_{II}/f = 0.8737$
(6) $\nu_+ - \nu_- = 37.7$
(7) $\nu_+ = 51.6$

EXAMPLE 6

Figure 11:
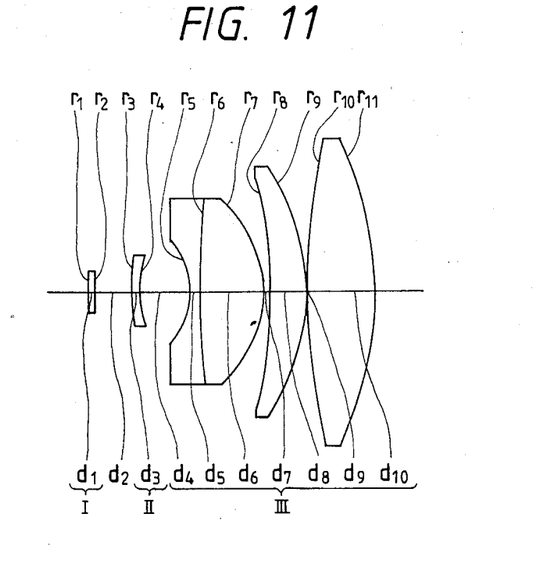
Figure 12:
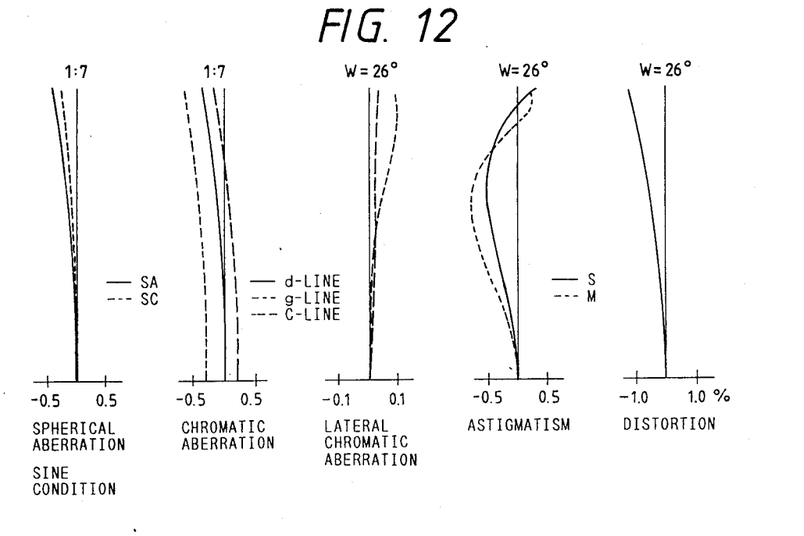

$F_{NO} = 1:7$ $\quad f = 100.00$
$M = -0.057X$ $\quad \omega = 26°$

| Surface No. | r | d | n | ν |
|---|---|---|---|---|
| 1 | 52.729 | 2.50 | 1.76200 | 40.1 |
| 2 | 640.412 | 13.20 | | |
| 3 | 115.308 | 2.50 | 1.72600 | 53.5 |
| 4 | 40.233 | 17.99 | | |
| 5 | −27.975 | 3.13 | 1.80518 | 25.4 |
| 6 | 289.136 | 22.28 | 1.65844 | 50.9 |
| 7 | −43.492 | 2.58 | | |
| 8 | −164.757 | 13.05 | 1.63854 | 55.4 |
| 9 | −76.918 | 0.63 | | |
| 10 | 242.966 | 23.71 | 1.68354 | 55.4 |
| 11 | −124.119 | | | |

(1) $f_I/f_{II} = -0.872$
(2) $f_{III}/f = 0.850$
(3) $r_I/f = 0.527$
(4) $n_I = 1.76200$
(5) $r_{II}/f = 0.402$
(6) $\nu_+ - \nu_- = 25.5$
(7) $\nu_+ = 55.4$

EXAMPLE 7

Figure 13:
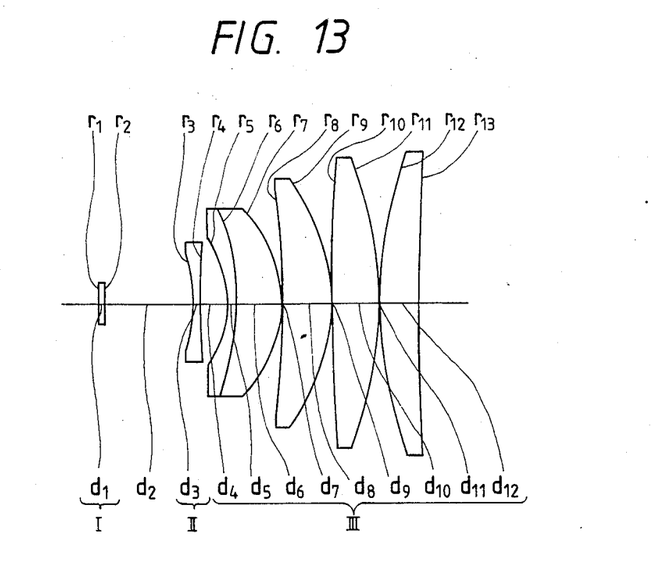
Figure 14:
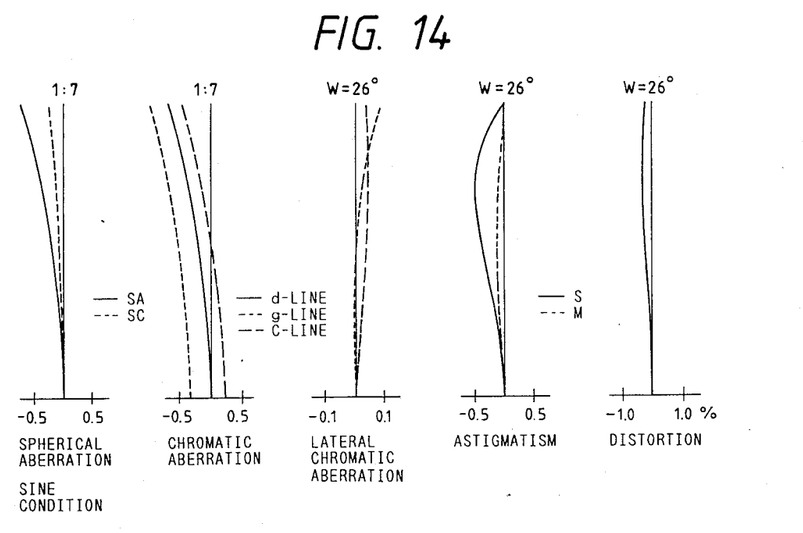
Figure 15:
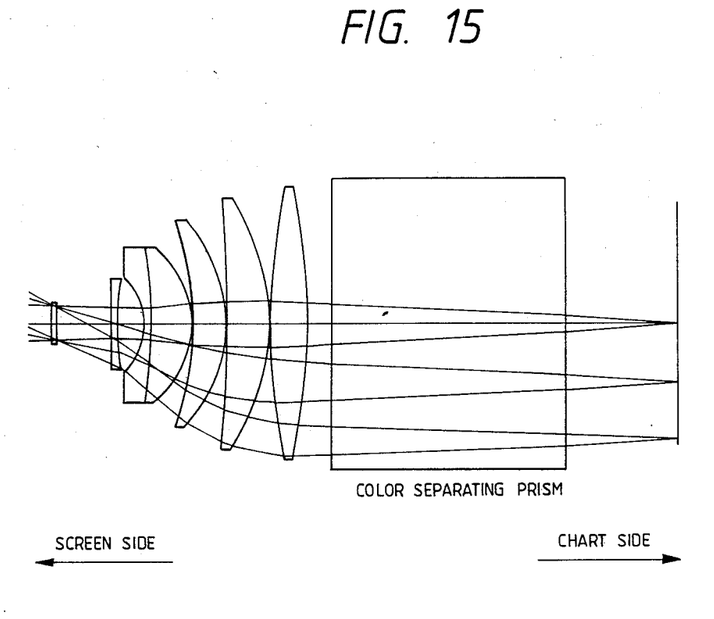
FIG. 15 shows schematically the lens system of Example 1 incorporated in an actual projection television system.

$F_{NO} = 1:7$ $\quad f = 100.00$
$M = -0.057X$ $\quad \omega = 26°$

| Surface No. | r | d | n | ν |
|---|---|---|---|---|
| 1 | 286.182 | 2.50 | 1.80518 | 25.4 |
| 2 | −212.218 | 31.19 | | |
| 3 | −66.293 | 2.50 | 1.76182 | 26.6 |
| 4 | 328.434 | 9.65 | | |

EXAMPLE 7

$F_{NO} = 1:7$　　$f = 100.00$
$M = -0.057X$　　$\omega = 26°$

| Surface No. | r | d | n | v |
|---|---|---|---|---|
| 5 | −37.943 | 3.12 | 1.80518 | 25.4 |
| 6 | −83.677 | 15.41 | 1.71300 | 58.8 |
| 7 | −46.176 | 0.62 | | |
| 8 | −321.392 | 17.59 | 1.51633 | 64.1 |
| 9 | −69.304 | 0.62 | | |
| 10 | 909.840 | 16.38 | 1.51633 | 64.1 |
| 11 | −140.089 | 0.62 | | |
| 12 | 159.967 | 14.00 | 1.51633 | 64.1 |
| 13 | 1264.198 | | | |

(1) $f_I/f_{II} = -2.101$
(2) $f_{III}/f = 0.688$
(3) $r_I/f = 2.862$
(4) $n_I = 1.80518$
(5) $r_{II}/f = 3.284$
(6) $\bar{\nu}_+ - \nu_- = 28.4$
(7) $\bar{\nu}_+ = 64.1$ As described above, the telecentric projection lens system of the present invention employs a simple lens composition consisting of six to eight elements, and yet this system, which satisfies conditions (1) and (2), and preferably also satisfies conditions (3)–(7), is capable of covering a wide field of more than 25 degrees in terms of the half viewing angle while achieving efficient compensation for various aberrations.

What is claimed is:

1. A telecentric projection system comprising, in order from a screen side to a chart side thereof, a first lens group consisting of a single positive lens element, a second lens group consisting of one of a single negative lens element and a positive lens cemented to a negative lens, and a third lens group comprising a negative lens cemented to a positive lens and a plurality of positive lens elements, which lens system satisfies the following conditions (1) and (2):

(1) $-2.5 < f_I/f_{II} < -0.5$
(2) $0.6 < f_{III}/f < 0.95$ where f: the focal length of the overall lens system
$f_I$: the focal length of the first lens group
$f_{II}$: the focal length of the second lens group
$f_{III}$: the focal length of the third lens group.

2. The telecentric projection lens system according to claim 1, wherein said first lens group consists of a single positive lens element having a convex surface directed toward the screen, and the following conditions (3) and (4) are additionally satisfied:

(3) $0.4 < r_I/f$
(4) $1.65 < n_I$ where $r_I$: the radius of curvature of the convex surface directed toward the screen
$n_I$: the refractive index of the first lens group at the d-line.

3. The telecentric projection lens system according to claim 1, wherein said second lens group consists of a single negative lens element having a concave surface directed toward the chart, and the following condition (5) is additionally satisfied:

(5) $0.3 < r_{II}/f < 3.5$ where $r_{II}$: the radius of curvature of the concave surface directed toward the chart.

4. The telecentric projection lens system according to claim 1, wherein said second lens group consists of a positive lens cemented to a negative lens in such a way that a concave surface is directed toward the chart, and the following condition (5) is additionally satisfied:

(5) $0.3 < r_{II}/f < 3.5$ where $r_{II}$: the radius of curvature of the concave surface directed toward the chart.

5. The telecentric projection lens system according to claim 1, wherein in said third lens group said negative lens is cemented to said positive lens in such a way that a strong concave surface is directed toward the screen, and the following condition (6) is additionally satisfied:

(6) $23 < \nu_+ - \nu_{31} < 42$ where $\nu_+$: the Abbe number of the positive lens in the cemented lens
$\nu_-$: the Abbe number of the negative lens in the cemented lens.

6. The telecentric projection lens system according to claim 1, wherein said third lens group includes two positive lens elements, and the following condition (7) is additionally satisfied:

(7) $45 < \bar{\nu}_+$ $\bar{\nu}_+$: the average Abbe number of the two positive lens elements.

7. The telecentric projection lens system according to claim 1, wherein said third lens group includes three positive lens elements, and the following condition (7) is additionally satisfied:

(7) $45 < \bar{\nu}_+$ $\bar{\nu}_+$: the average Abbe number of the three positive lens elements.

* * * * *